(12) United States Patent
Zmudzinski et al.

(10) Patent No.: US 8,301,917 B2
(45) Date of Patent: Oct. 30, 2012

(54) METHOD AND APPARATUS FOR MANAGING POWER FROM A SEQUESTERED PARTITION OF A PROCESSING SYSTEM

(75) Inventors: Krystof C. Zmudzinski, Forest Grove, OR (US); Saul Lewites, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 12/849,627

(22) Filed: Aug. 3, 2010

(65) Prior Publication Data

US 2011/0202778 A1 Aug. 18, 2011

Related U.S. Application Data

(63) Continuation of application No. 11/496,906, filed on Jul. 31, 2006, now Pat. No. 7,797,555, which is a continuation-in-part of application No. 11/433,944, filed on May 12, 2006, now Pat. No. 7,647,509.

(51) Int. Cl.
*G06F 1/00* (2006.01)
*G06F 9/00* (2006.01)
*G06F 9/24* (2006.01)
*G06F 15/177* (2006.01)
*G06F 1/26* (2006.01)
*G06F 1/32* (2006.01)

(52) U.S. Cl. ............... 713/300; 713/1; 713/2; 713/100; 713/320; 713/323; 713/324; 710/260

(58) Field of Classification Search ............ 713/1, 2, 713/100, 300, 320, 323, 324; 710/260
See application file for complete search history.

(56) References Cited

U.S. PATENT DOCUMENTS

| 5,310,277 A | 5/1994 | Uotila |
| 5,878,264 A | 3/1999 | Ebrahim |
| 6,446,213 B1 | 9/2002 | Yamaki |

(Continued)

FOREIGN PATENT DOCUMENTS

KR 10-2001-0082040 A 8/2001

(Continued)

OTHER PUBLICATIONS

International Search Report and Written Opinion received for PCT Application No. PCT/US2007/009337, mailed on Sep. 19, 2007, 10 pages.

(Continued)

*Primary Examiner* — Ji H Bae
(74) *Attorney, Agent, or Firm* — Schwabe, Williamson & Wyatt, P.C.

(57) ABSTRACT

A processing system may include a first processing unit for a legacy partition and a second processing unit for a sequestered partition. In one embodiment, a first interrupt handler in the legacy partition may support power management for the first processing unit. A second interrupt handler in the sequestered partition may cause the sequestered partition to take control of power management hardware in the processing system when the legacy partition enters reduced power mode. For example, the second interrupt handler may program the power management hardware to route interrupts to the second processing unit. The sequestered partition may relinquish control of power management hardware to the legacy partition when the legacy partition exits reduced power mode. A power policy manager in the sequestered partition may support features such as wake for incoming communications, wake to record, etc. Other embodiments are described and claimed.

24 Claims, 7 Drawing Sheets

U.S. PATENT DOCUMENTS

| | | | |
|---|---|---|---|
| 6,772,241 | B1 | 8/2004 | George et al. |
| 6,845,470 | B2 | 1/2005 | Austen et al. |
| 6,934,833 | B2 | 8/2005 | Larvoire |
| 6,961,859 | B2 | 11/2005 | Derocher et al. |
| 6,973,517 | B1 | 12/2005 | Golden et al. |
| 6,976,099 | B2 | 12/2005 | George et al. |
| 6,996,706 | B1 | 2/2006 | Madden et al. |
| 7,284,100 | B2 | 10/2007 | Slegel et al. |
| 7,340,634 | B2 | 3/2008 | Leung et al. |
| 7,418,586 | B2 | 8/2008 | Lewites |
| 7,610,481 | B2 | 10/2009 | Cool et al. |
| 7,640,426 | B2 | 12/2009 | Garney |
| 7,647,509 | B2 | 1/2010 | Lewites et al. |
| 7,716,465 | B2 | 5/2010 | Lewites |
| 7,797,555 | B2 | 9/2010 | Zmudzinski et al. |
| 7,802,081 | B2 | 9/2010 | Schultz et al. |
| 2001/0018717 | A1 | 8/2001 | Shimotono |
| 2002/0007464 | A1 | 1/2002 | Fung |
| 2002/0124040 | A1 | 9/2002 | Foster et al. |
| 2002/0156824 | A1 | 10/2002 | Armstrong et al. |
| 2003/0009654 | A1 | 1/2003 | Nalawadi et al. |
| 2003/0115443 | A1 | 6/2003 | Cepulis et al. |
| 2003/0120706 | A1 | 6/2003 | Harjula |
| 2004/0034802 | A1 | 2/2004 | Hamilton |
| 2004/0068645 | A1 | 4/2004 | Larvoire |
| 2004/0111596 | A1 | 6/2004 | Rawson, III |
| 2004/0128563 | A1 | 7/2004 | Kaushik et al. |
| 2004/0225907 | A1 | 11/2004 | Jain et al. |
| 2005/0044453 | A1 | 2/2005 | Dunstan et al. |
| 2005/0086356 | A1 | 4/2005 | Shah et al. |
| 2005/0086547 | A1 | 4/2005 | Kobayashi et al. |
| 2005/0125580 | A1 | 6/2005 | Madukkarumukumana et al. |
| 2005/0144434 | A1 | 6/2005 | Taylor et al. |
| 2005/0289283 | A1 | 12/2005 | Warrier et al. |

FOREIGN PATENT DOCUMENTS

| | | |
|---|---|---|
| WO | 99/17187 A1 | 4/1999 |
| WO | 99/41672 A1 | 8/1999 |

OTHER PUBLICATIONS

European Search Report received for European Application No. 07253010.8, mailed on Sep. 2, 2009, 5 pages.

Felter et al., "Energy Management for Commercial Servers", Computer, vol. 36, Issue 12, Dec. 2003, pp. 39-48.

Bogowitz et al., "Reducing Costs with Intel® Active Management Technology", Aug. 2005.

"Intel® 82573E/V/L Gigabit Ethernet Controllers", 2005.

Bogowitz et al., "Intel® Active Management Technology Reduces IT Costs with Improved PC Manageability", Sep. 2004.

European Search Report received for European Application No. 11009484.4, mailed Mar. 15, 2012, 4 pages.

METHOD AND APPARATUS FOR MANAGING POWER FROM A SEQUESTERED PARTITION OF A PROCESSING SYSTEM

CROSS-REFERENCE TO RELATED APPLICATIONS

The present application is a continuation of U.S. patent application Ser. No. 11/496,906 (now U.S. Pat. 7,797,555, issued on Sept. 14, 2010), entitled "Method and Apparatus for Managing Power from a Sequestered Partition of a Processing System" filed on Jul. 31, 2006, which is a continuation in part of U.S. patent application Ser. No. 11/433,944, filed May 12, 2006 (now U.S. Pat. No. 7,647,509, issued on Jan. 12, 2010), entitled "Method and Apparatus for Managing Power in a Processing System with Multiple Partitions."

FIELD OF THE INVENTION

The present disclosure relates generally to the field of data processing, and more particularly to methods and related apparatus for managing power in a processing system with multiple partitions.

BACKGROUND

In a processing system where two or more processing cores or hyper-threads (HTs) exist, the operating system (OS) normally owns all of those processing units. When the workload of the processing system is low or idle, the OS may shift all of the processing units into a low power or standby mode. For instance, Revision 3.0a of the Advanced Configuration And Power Interface (ACPI) Specification, dated Dec. 30, 2005 (the "ACPI Specification") describes standard interfaces for OS-directed configuration and power management on laptops, desktops, and servers. The ACPI Specification may be obtained from www.acpi.info/spec.htm.

However, existing processing systems do not support separate power planes for each processing core or HT. For example, when a conventional platform with two processing cores changes the sleep state of the processing system, the platform must set both of the processing cores to the same ACPI sleep state.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In a typical computer, firmware provides the machine instructions that control the system when the system is being powered up or has been reset, but before an operating system (OS) is booted. Firmware may also control certain operations after the OS has been loaded, such as operations for handling certain hardware events and/or system interrupts. The firmware may handle pre-boot and post-boot operations through a set of routines referred to collectively as a basic input/output system (BIOS). Typically, the BIOS provides an interface between hardware components of the system and software components such as the OS.

Some years ago, the extensible firmware interface (EFI) model was announced. Version 1.10 of the EFI Specification, dated Dec. 1, 2002, (the "EFI Specification") may be obtained from www.intel.com/technology/efi/main_specification.htm. The EFI Specification defines a set of standard interfaces and structures to be provided by low-level platform firmware. Those interfaces and structures may be used for tasks such as loading additional firmware, running pre-boot applications, booting the OS, and providing runtime services after an OS has been booted. The Intel® Platform Innovation Framework for EFI is an example of a platform framework that is based on the EFI model.

There are not expected to be any future versions of the EFI specification. However, in 2006, the Unified EFI Forum released Version 2.0 of the Unified EFI (UEFI) Specification, dated Jan. 31, 2006 (the "UEFI Specification"). The UEFI Specification may be obtained from www.uefi.org/index.php?pg=4. The UEFI specification is based on the EFI specification, with corrections and changes managed by the Unified EFI Forum. In the coming years, EFI-based or UEFI-based platform frameworks may supplant frameworks based on the legacy BIOS model as the frameworks of choice for designing, building, and operating data processing systems.

For purposes of this disclosure, the terms "firmware" and "BIOS" refer to software that may execute in a processing system before the processing system has booted to an OS, software that may provide runtime services that allow the OS or other components to interact with the processing system hardware, and similar types of software components. Thus, the terms "firmware" and "BIOS" include, without limitation, software based on the UEFI model and software based on the legacy BIOS model. Traditionally, firmware has typically been stored in non-volatile memory. In more recent years, however, processing systems have been developed that store firmware in other types of storage devices or obtain firmware from remote repositories.

For purposes of this disclosure, depending upon the particular implementation under consideration, the term "processing unit" may denote an individual central processing unit (CPU) within a processing system, a processing core within a CPU, a logical processing unit such as a hyper-thread (HT), or any similar processing resource, or any collection of such resources configured to operate collectively as a unit. In a system where multiple processing units exist, the OS normally owns all of the processing units. However, virtualization software, such as a virtual machine monitor (VMM), may be used to allocate one processing unit to one virtual machine (VM), and another processing unit to another VM.

Also, in some processing systems, it is possible to hide one or more of the processing units from the OS, for instance by modifying the ACPI tables produced by the BIOS. In some systems it is also possible to hide one or more portions of random access memory (RAM) from the OS. Additionally, in some systems, several peripheral and integrated devices can be hidden from the OS, for example by updating device-hide registers or other locations in the system's input/output (I/O) controller hub (ICH). These techniques may be used to hide devices for debugging purposes.

In addition to conventional uses for debugging purposes, techniques such as those described above may be used to create two (or more) execution environments within a single processing system. Such an execution environment may also be called a partition. For instance, a processing system may include a main partition and a sequestered partition. The main partition may include a general purpose OS (e.g., one of the various Windows®-based OSs, a Linux®-based OS, etc.) and one or more user applications (e.g., a web server, a business application, etc.). The main partition may also be referred to as the legacy partition. The sequestered partition may not be visible to the main OS, and the sequestered partition may be used for a wide variety of applications, including, without limitation, I/O offloading, platform manageability, and/or fault prediction.

Software in a processing system may trap power management commands (e.g., a standby command) from the main OS, and may allow one partition of the processing system (e.g., an embedded or sequestered partition) to remain functional, while another partition (e.g., a legacy or main partition) and the devices within that partition are put into a reduced power mode. Also, this functionality may be deployed without requiring any modifications to the OS for the main partition. In addition, when the legacy partition is in reduced power mode, the sequestered partition may temporarily take control of power management hardware in the processing system. For example, the sequestered partition may take control of a real time clock (RTC) and ACPI hardware (e.g., registers for controlling the power state). The sequestered partition may then use the power management hardware to provide enhanced functionality, such as additional power management features, additional services, etc. When it is time for the legacy partition to leave the reduced power mode, the sequestered partition may restore the power management hardware to the state existing before the legacy partition entered the reduced power mode.

Figure 1:
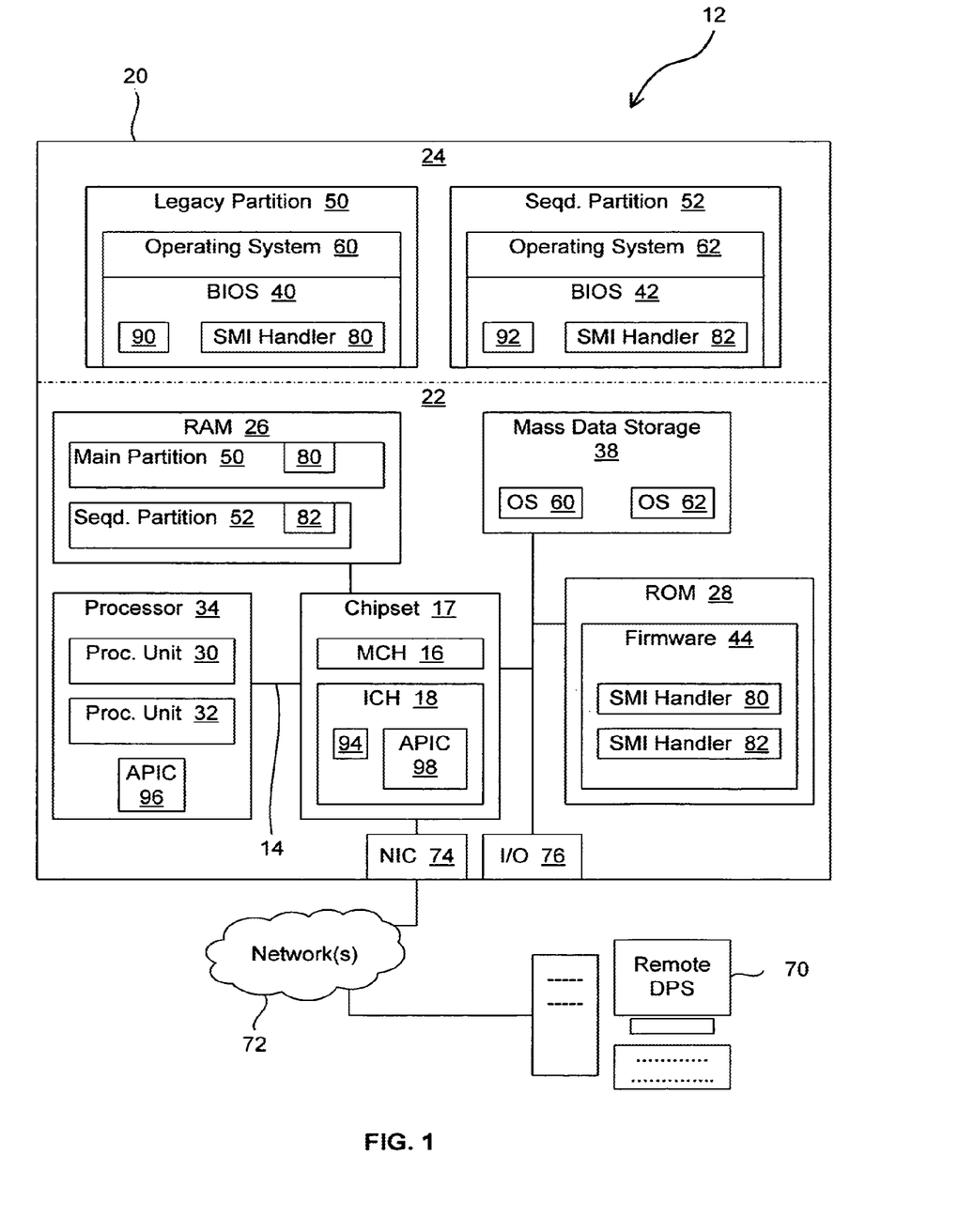
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 22 and software components 24. The hardware components may include, for example, one or more processors or CPUs 34, communicatively coupled, directly or indirectly, to various other components via one or more system buses 14 or other communication pathways or mediums. As used herein, the term "bus" includes pathways that may be shared by more than two devices, as well as point-to-point pathways.

In the example embodiment, processor 34 includes multiple processing units, such as a first processing core 30 and a second processing core 32. Alternatively, a processing system may include multiple processors, each having at least one processing unit. The processing units may be implemented as processing cores, as HT resources, or as any other suitable technology for executing multiple threads simultaneously or substantially simultaneously. In the example embodiment, processing unit 30 may serve as an application processor (AP) for processing system 20, and processing unit 32 may serve as a bootstrap processor (BSP).

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Input devices may communicate with processing system 20 via an I/O port 76, for example. Processing system 20 may also respond to directives or other types of information received from other processing systems or other input sources or signals. Processing system 20 may utilize one or more connections to one or more remote data processing systems 70, for example through a network interface controller (NIC) 74, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 34 may be communicatively coupled to one or more volatile or non-volatile data storage devices, such as RAM 26, read-only memory (ROM) 28, and one or more mass storage devices 38. The mass storage devices 38 may include, for instance, integrated drive electronics (IDE), small computer system interface (SCSI), and/or serial advanced technology architecture (SATA) hard drives. The data storage devices may also include other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

Processor 34 may also be communicatively coupled to additional components, such as one or more video controllers, SCSI controllers, network controllers, universal serial bus (USB) controllers, I/O ports, input devices such as a camera, etc. Some of those components may be implemented in a chipset 17 that is coupled directly or indirectly to RAM 26, processor 34, and other devices. In the example embodiment of FIG. 1, chipset 17 includes a memory controller hub (MCH) 16 and an ICH 18. MCH 16 and ICH 18 may communicate with each other via a direct media interface (DMI), for instance. Chipset 17 may also include other bridges or hubs (e.g., a peripheral component interconnect (PCI) root bridge, etc.) for communicatively coupling system components. In the example embodiment, ICH 18 includes an advanced programmable interrupt controller (APIC) referred to as I/O APIC 98. In addition, processor 34 may include a local APIC 96.

Some components, such as NIC 74, for example, may be implemented as adapter cards with interfaces (e.g., a PCI connector) for communicating with a bus. Alternatively, devices may be implemented as on-board or embedded controllers, using components such as programmable or non-programmable logic devices or arrays, application-specific integrated circuits (ASICs), embedded processors, smart cards, etc.

In the example embodiment of FIG. 1, processing system 20 uses firmware-based partitioning. Specifically, after processing system 20 has been started or powered on, firmware 44 may create a main partition 50 and a sequestered partition 52 within processing system 20. Main partition 50 may include the firmware code (e.g., BIOS 40) and the OS code (e.g., OS 60) running on the BSP. The main partition may also be referred to as a non-sequestered partition or a legacy partition 50. Sequestered partition 52 may include the firmware code (e.g., BIOS 42) and the OS code (e.g., OS 62) running on the AP. The sequestered partition may also be referred to as an embedded partition. In alternative embodiments, partitions may run on other types of processing units.

In the example embodiment, ICH 18 includes configuration constructs such as device hide registers 94 that allow various components or devices within processing system 20 to be disabled or hidden. For instance, the configuration constructs may be used to cause ICH 18 to block configuration cycles for certain devices. Also, in the example embodiment, ACPI parameters 90 for legacy partition 50 may be used to hide processing unit 32 and one or more portions of RAM 26 from OS 60, while ACPI parameters 92 for sequestered partition 52 may be used to hide processing unit 30 and other portions of RAM 26 from OS 62.

Additional details about an example I/O APIC, example device hide registers, and other topics may be obtained from the Intel® I/O Controller Hub 6 (ICH6) Family Datasheet, dated January 2004 (the "ICH6 datasheet"). The ICH6 datasheet may be obtained from www.intel.com/design/chipsets/datashts/301473.htm. Additional details about ACPI parameters and related topics may be obtained from the ACPI Specification at the Internet location referenced above. An example embodiment of a process for creating multiple partitions in a processing system is described in detail below with regard to FIGS. 6 and 7.

In alternative embodiments, other data storage constructs within an ICH and/or within one or more other components may be used to disable or hide devices within a processing system, and other techniques may be used to hide processing units and portions of RAM.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, subprograms, handlers, etc. For instance, the term "program" can be used to refer to a complete compilation unit (i.e., a set of instructions that can be compiled independently), a collection of compilation units, or a portion of a compilation unit.

Thus, the term "program" may be used to refer to any collection of instructions which, when executed by a processing system, perform a desired operation or operations. For instance, ROM 28, data storage device 38, and/or RAM 26 may include various sets of instructions which, when executed, perform various operations. Such sets of instructions may be referred to in general as software.

In an example embodiment, processing system 20 uses techniques such as those described above to create two distinct partitions in processing system 20: legacy partition 50 and sequestered partition 52. In alternative embodiments, a processing system may have more than one legacy partition and/or more than one sequestered partition.

In an example embodiment, the components that constitute legacy partition 50 and sequestered partition 52 are loaded into, and operate from, RAM 26. For example, SMI handler 80 may be loaded into RAM 26 as part of legacy partition 50, and SMI handler 82 may be loaded into RAM 26 as part of sequestered partition 52. In alternative embodiments, some portions of one or more partitions may reside in other hardware components, such as within a processing unit or a chipset.

In the embodiment of FIG. 1, each partition receives its own OS and its own applications. The OS 60 for legacy partition 50 may be the same as, or different from, the OS 62 for sequestered partition 52. When created, each partition may also receive a distinct BIOS, based on the firmware code 44 from ROM 28. In the embodiment of FIG. 1, BIOS 40 gets loaded into legacy partition 50, BIOS 42 gets loaded into sequestered partition 52, and BIOS 40 differs from BIOS 42. For example, as described in greater detail below, one or more of the interrupt handlers in BIOS 40 may differ from those in BIOS 42. In alternative embodiments, both partitions may receive substantially identical copies of the BIOS.

In the example embodiment, processing system 20 supports system management mode (SMM), and firmware 44 includes various system management interrupt (SMI) handlers 80, 82. During the pre-boot process, processing system 20 may load SMI handler 80 into legacy partition 50 as part of BIOS 40, and processing system 20 may load SMI handler 82 into sequestered partition 52 as part of BIOS 42.

As described at www.rcollins.org/ddj/Jan97/Jan97.html, SMM may be used for power management features and other OS independent functions. For instance, MCH 16 and/or other chipset components in processing system 20 may be configured to recognize certain types of events (e.g., timeouts, keyboard input signals, etc.) and to assert SMIs in response to such events. MCH 16 may assert an SMI by asserting an SMI line on bus 14, for instance. Processing system 20 may then enter SMM at the next instruction boundary and save the current state.

While processing system 20 is in SMM, MCH 16 may redirect all memory cycles to a protected area of RAM 26 reserved specifically for SMM. This memory area may be referred to as system management RAM (SMRAM). When SMM is entered, processing unit 30 and processing unit 32 may switch from protected mode to real mode, and each processing unit may save its entire internal state to SMRAM.

After the state has been saved, SMM code may control the operations of processing system 20. For instance, those operations may be controlled by code in the BIOS, such as SMI handler 80 and SMI handler 82. Thus, after the state has been saved, processing system 20 may begin executing SMI handlers 80 and 82. Once SMI handlers 80 and 82 have finished handling the SMI, each handler may execute a resume (RSM) instruction to exit SMM. In response, processing units 30 and 32 may each restore its state, return to protected mode, and resume execution of the program that was running when the SMI was received.

In the example embodiment, SMI handlers 80 and 82 may be similar to each other, but SMI handler 80 includes instructions for handling aspects of power management to be controlled by legacy partition 50, while SMI handler 82 includes instructions for handling aspects of power management to be controlled by sequestered partition 52.

Figure 2:
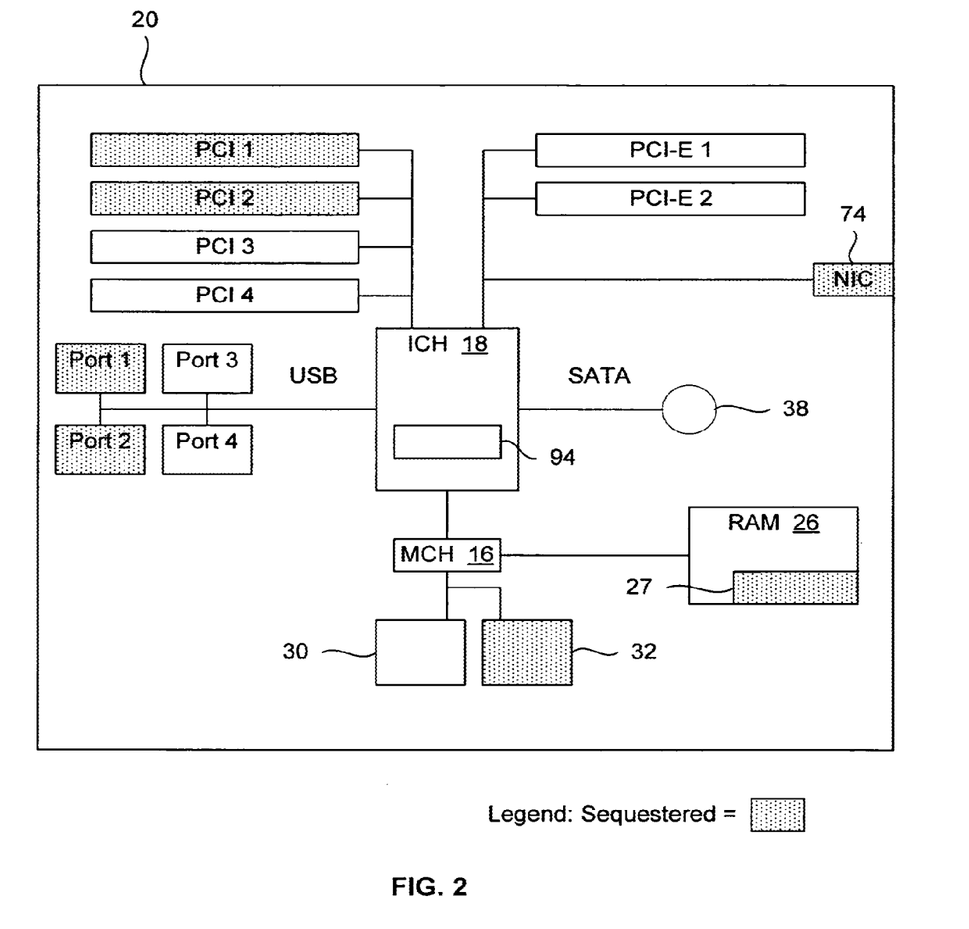
FIG. 2 is a block diagram providing additional details regarding some of the hardware components in the processing system of FIG. 1.

FIG. 2 is a block diagram providing additional details regarding some of the hardware components in the processing system of FIG. 1. FIG. 2 highlights the partitioning of the expansion slots and integrated devices in an example system. In particular, FIG. 2 shows dotted fill in the blocks for certain devices, to illustrate that those devices, or portions thereof, will be hidden from OS 60. For instance, in the example embodiment, the following components will be made available to sequestered partition 52, but hidden from OS 60 in legacy partition 50:
- processing unit 32;
- NIC 74;
- USB ports 1 and 2; and
- PCI slots 1 and 2.

The following components may remain visible to, and available for use by, OS 60:
- processing unit 30;
- mass storage device 38;
- USB ports 3 and 4;
- PCI-Express (PCI-E) slots 1 and 2; and
- PCI slots 3 and 4.

Also, in the example embodiment, most of RAM 26 will remain visible to OS 60, but a portion 27 will be hidden from OS 60 and made available to sequestered partition 52.

In the example embodiment, the operations for sequestering devices are performed during the pre-boot portion of the initialization process that takes place when processing system 20 is turned on or reset. In one embodiment, BIOS 40 in legacy partition 50 has primary control of the initialization operations of processing system 20. However, legacy partition 50 may pass control to sequestered partition 52 when appropriate, for instance to allow BIOS 42 to initialize or configure memory for sequestered partition 52. Additional details concerning an example process for creating partitions in processing system 20 are provided below, with regard to FIGS. 6 and 7.

Figure 3:
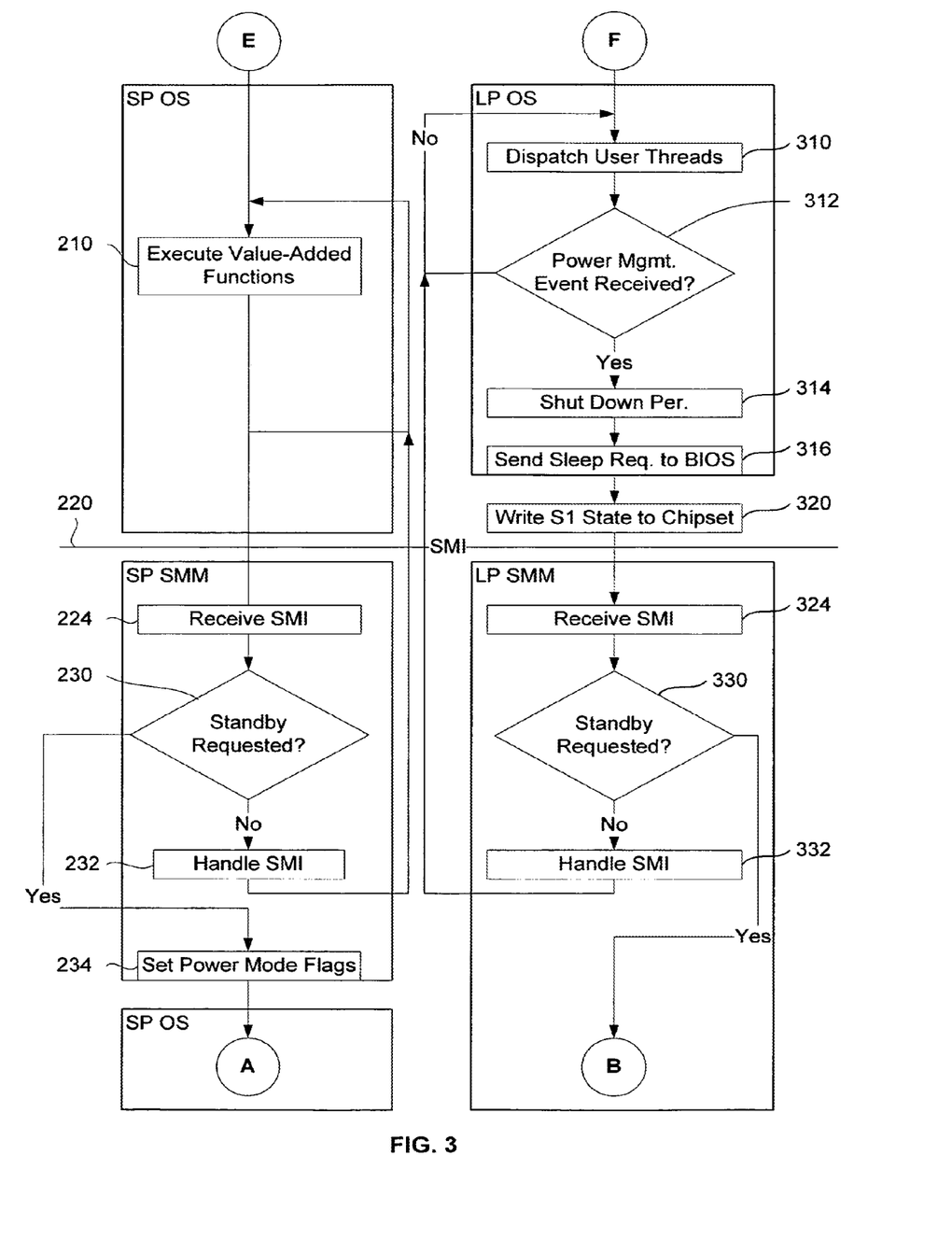
FIGS. 3-5 are flowcharts depicting various aspects of a process for managing power in a processing system with multiple partitions, according to an example embodiment of the present invention.
Figure 4:
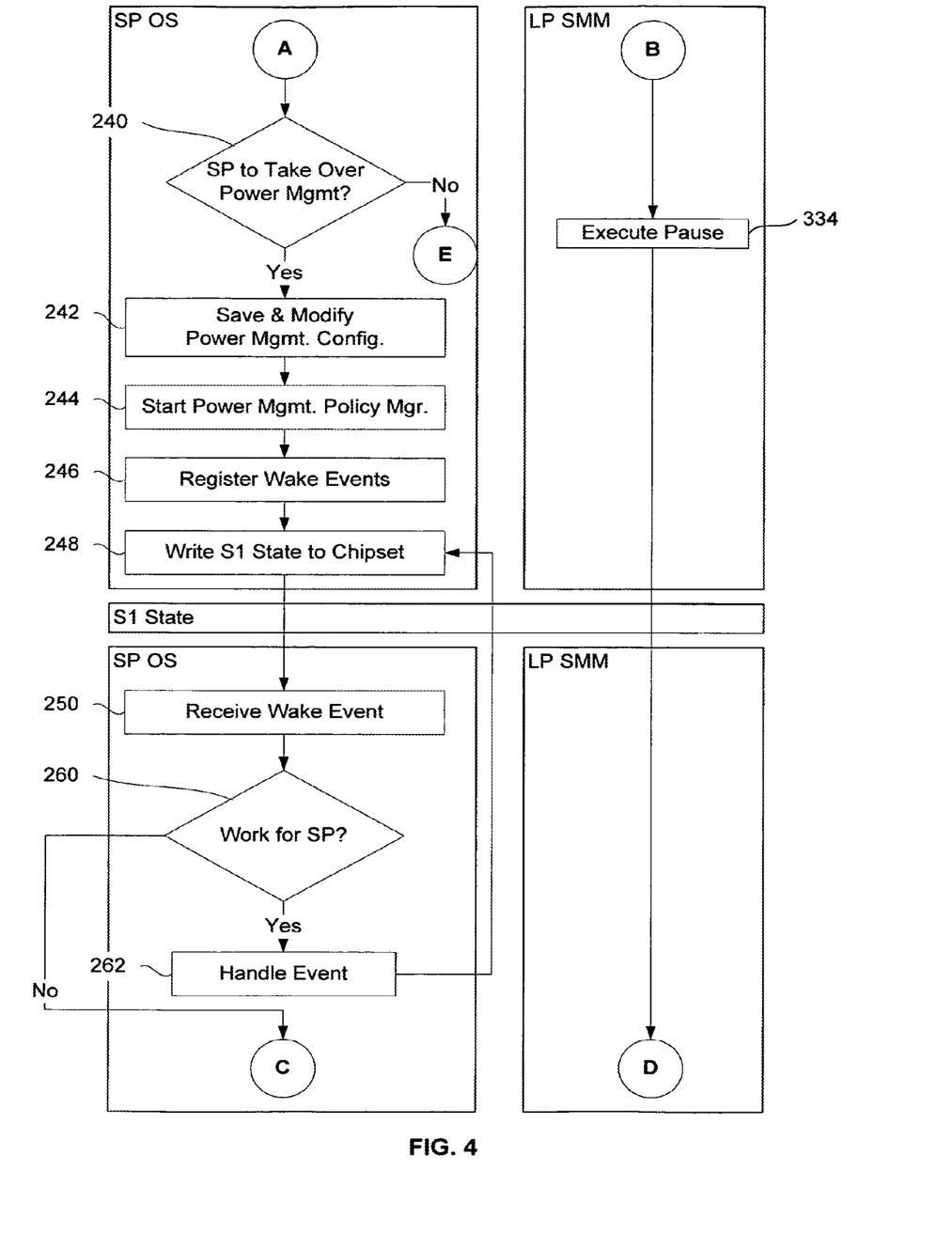
Figure 5:
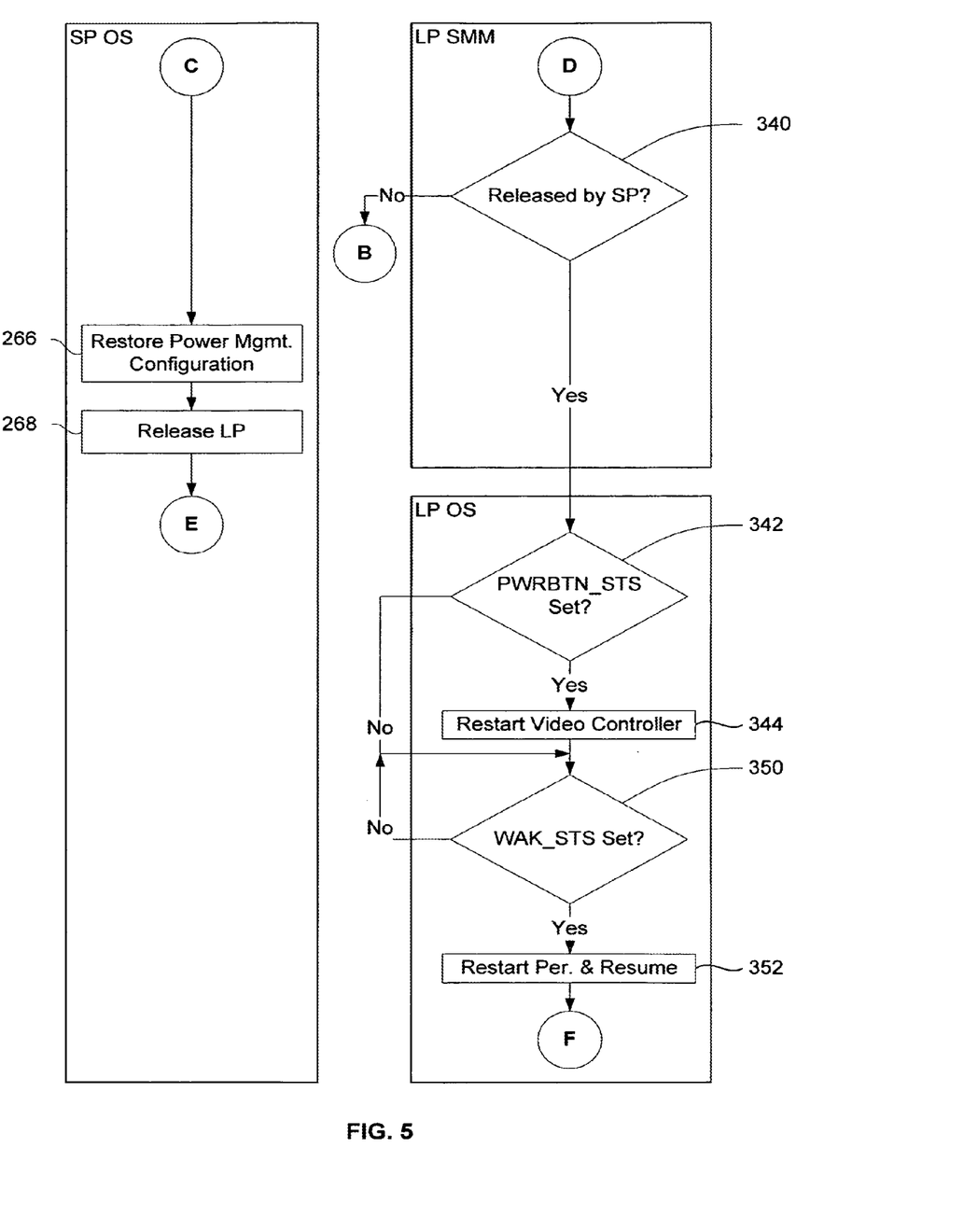

FIGS. 3-5 are flowcharts depicting various aspects of a process for managing power in a processing system with multiple partitions, according to an example embodiment of the present invention. In FIGS. 3-5, certain operation blocks are enclosed within larger blocks, referred to herein as "context blocks." The context blocks labeled "SP OS" denote groups of operations that are performed under control of OS 62 in sequestered partition 52. Similarly, the context blocks labeled "SP SMM" denote operations that are performed by processing unit 32 in SMM mode, possibly under the control of SMI handler 82. Likewise, the "LP OS" context blocks pertain to operations controlled by OS 60 in legacy partition 50, and the "LP SMM" context blocks pertain to operations performed by processing unit 30 in SMM mode (possibly under the control of SMI handler 80). In addition, the context blocks on the left and right sides of FIGS. 3 and 4 are arranged vertically to show which operations of legacy partition 50 are performed at approximately the same time as adjacent operations of sequestered partition 52.

The example process depicted in FIG. 3 begins after processing system 20 has booted, with OS 60 executing in legacy partition 50, with OS 62 executing in sequestered partition 52, and with processing units 30 and 32 operating in a high power or full power mode. For example, processing units 30 and 32 may be in an ACPI maximum processor performance state (P0), within an actively executing processor power state (C0), within a global working state (G0/S0). Alternatively, processing units 30 and 32 may be in a different processor performance state within G0/S0, or similar power consumption states in non-ACPI-based systems.

As indicated at block 210, sequestered partition 52 may be performing value added functions, such as I/O offloading, fault prediction, telephony services such as voice over Internet protocol (VoIP), operations to facilitate local and/or remote platform management, operations to support digital home functionality (e.g., updating lists of available content), etc. At the same time, legacy partition 50 may be performing additional operations. For instance, a person may be using applications in legacy partition 50 such as a web browser, a word processor, etc. Accordingly, OS 60 may be dispatching user mode threads, as indicated at block 310.

It may be desirable to keep some or all of the applications in sequestered partition 52 running, even when none of the applications in legacy partition 50 is being used. For example, a laptop computer may include, among other applications, a web browser in a main partition and a digital video recorder (DVR) application in a sequestered partition. When no one is using the web browser, it may be beneficial to put the main partition in a low power mode. However, at the same time, it may desirable to keep the sequestered partition at a high power or full power state to allow the sequestered partition to perform tasks such as platform maintenance (e.g., virus scans, data backups, disk defragmentation) or user programmed functions (e.g., sending faxes at predetermined times, recording television programs or other broadcasted or transmitted content in accordance with a predetermined recording schedule). Alternatively, if no one is using the web browser and there is no program to record, it may be beneficial to put both partitions in a low power mode. However, the sequestered partition may periodically exit the low power mode, to determine whether any of the partitions has work to do. As described in greater detail below, embodiments of the present invention may provide the above functionality.

In particular, at block 312, OS 60 may determine whether it has received a standby request. For instance, a standby request may be sent to OS 60 in response to a user event (e.g., when the user selects a standby option from a power management menu of OS 60) or a power management event (e.g., when a timer expires to indicate that processing system 20 or legacy partition 50 has been idle for a predetermined period of time). If OS 60 has not received a standby request, processing unit 30 may remain in a high power state, and OS 60 may continue dispatching user mode threads.

However, if OS 60 has received a message or event indicating that processing system 20 or legacy partition 50 should enter a low power or standby mode, OS 60 may shut down internal and/or peripheral devices assigned to legacy partition 50, as indicated at block 314. Those peripherals may include, for example, video adapters, hard disks, USB controllers, network interface controllers (NICs), etc. As shown at block 316, OS 60 may then use an ACPI port to instruct BIOS 40 to put processing unit 30 into a sleep state, such as the S1 sleep state within the G1 global sleep state. For purposes of this disclosure, the terms "standby command" and "power reduction command" refer to any command or request from an OS to a BIOS to enter a reduced power state.

In response to the standby command, BIOS 40 may write values to chipset 17 to indicate that chipset 17 is to put processing unit 30 into a reduced power mode, such as the S1 sleep state, as shown at block 320. For instance, BIOS 40 may write a predetermined value to a sleep type (SLP_TYP) field in an ACPI register in chipset 17. As indicated at line 220, when BIOS 40 updates the SLP_TYP field, chipset 17 may respond by issuing an SMI. For purposes of this disclosure, such an SMI may be referred to as a standby SMI. A conventional SMI handler in a conventional processing system may respond to a standby SMI by updating the sleep enable (SLP_EN) field in the ACPI register, thereby instructing the chipset to switch to the sleep state indicated in the SLP_TYP field.

However, in the example embodiment, standby SMIs trigger SMI handler 80 in legacy partition 50 and SMI handler 82 in sequestered partition 52, as indicated at blocks 324 and 224, respectively. SMI handlers 80 and 82 do not immediately update the SLP_EN field, but instead keep processing system 20 in the S0 state, so that sequestered partition 52 can continue to run.

Referring again to FIG. 3, as indicated at block 330, SMI handler 80 may determine whether the SMI represents a sleep or standby command. If the SMI does not represent a sleep or standby command, SMI handler 80 may process the SMI normally, as shown at block 332. Otherwise, SMI handler 80 may enter an idle loop designed to reduce the amount of power consumed by processing unit 30. SMI handler 80 may thus transition legacy partition 50 into a reduced power mode.

For instance, the process may pass through page connector B, and SMI handler 80 may execute a pause instruction, as indicated at block 334 of FIG. 4. The process may then pass through page connector D, and SMI handler 80 may determine whether sequestered partition 52 has released legacy partition 50 from low power mode, as indicated at block 340. This determination may be made by reference to a predetermined flag in a shared memory area, or through use of any other suitable approach to passing data. As described below with regard to block 232, in the example embodiment, SMI handler 82 sets a power mode flag or power mode indicator to keep legacy partition 50 in low power mode. This flag may be referred to as the legacy standby flag. If sequestered partition 52 has not released legacy partition 50 from low power mode, the process may return to block 334 through page connector B, and SMI handler 80 may remain in the idle loop and continue executing pause instructions. This idle loop may result in reduced power consumption, and may be considered a "pseudo standby" state. When legacy partition 50 is in the pseudo standby state, processing unit 30 may be in an active power state (e.g., the ACPI S0 power state), but processing unit 30 may consume less power than when executing typical user mode threads. Also, legacy partition 50 may keep the power consumption low until legacy partition 50 is instructed to leave the reduced power mode. Furthermore, legacy partition 50 may move back and forth between the S0 and S1 states without leaving the reduced power mode.

However, if sequestered partition 52 modifies or clears the legacy standby flag to release legacy partition 50 from low power mode, SMI handler 80 may terminate the idle loop, transition processing unit 30 from SMM to protected mode, and return control to OS 60, as indicated by the arrow from block 340 to block 342. SMI handler 80 may thus cause legacy partition 50 to leave the reduced power mode.

As shown at block 342, after legacy partition 50 exits SMI handler 80, OS 60 may determine whether the power button wake status (PWRBTN_STS) bit in the power management 1 status (PM1_STS) register is set. If that bit is set, OS 60 may restart the video controller or controllers associated with legacy partition 50, if any. As shown at block 350, OS 60 may then determine whether the sleep state has been completed, for instance by checking whether the wake status (WAK_STS) bit is set. Once the WAK_STS bit has been set, OS 60 may restart any necessary peripherals or devices for legacy partition 50, and legacy partition 50 may then resume high power or full power operation, as shown at block 352. For example, the process may pass through page connector F, and OS 60 may dispatch user threads, etc, as indicated above.

Referring again to block 224 of FIG. 2, after sequestered partition 52 receives the SMI, SMI handler 82 may determine whether the SMI represents a standby command, as shown at block 230. If the SMI is not a standby command, SMI handler 82 may handle the SMI normally, as shown at block 232. Otherwise, SMI handler 82 may set power mode flags, as shown at block 234. The flags may include the legacy standby flag to keep legacy partition 50 in low power mode, as indicated above with regard to block 340. The flags may also include a sequestered power control flag that sequestered OS 62 can read to determine whether sequestered OS 62 should take control of power management for processing system 22.

SMI handler 82 may decide when and how to set the power mode flags based on what legacy OS 60 did to cause the SMI. For example, if the SMI was triggered by legacy OS 60 attempting to put the system in S3 state, SMI handler 82 may set (a) the legacy standby flag to keep legacy partition 50 in low power mode, and (b) the sequestered power control flag to notify legacy OS 62 that sequestered OS 62 is to control power management for processing system 22.

SMI handler 82 may then transition processing unit 32 from SMM to protected mode, and may return control to OS 62. The process may then pass through page connector A. As described in greater detail below with regard to block 242 and the subsequent blocks in FIG. 4, sequestered OS 62 may then take control of power management.

However, before actually taking over the power management duties, when sequestered partition 52 returns from SMM mode to protected mode, OS 62 may check the sequestered power control flag to determine whether OS 62 should take control of power management, as indicated at block 240 of FIG. 4. In one embodiment, OS 62 checks the sequestered power control flag periodically in response to expiration of a timer. OS 62 then stops the timer and/or clears the flag when OS 62 takes control of power management. OS 62 then restarts the timer when control of power management hardware is returned to legacy partition 50. In alternative embodiments, other methodologies may be used.

If sequestered partition 52 is not to take control of power management, the process may pass through page connector E to block 210, and sequestered partition 52 may continue providing value added services. However, if sequestered partition 52 is to take control of power management, OS 62 may save the current power management configuration and may then modify that configuration, as indicated at block 242. For instance, OS 62 may save the contents of the RTC control registers, as well as the contents of the RTC and ACPI I/O APIC entries (e.g., the entries for interrupt request line (IRQ) 8 and IRQ9). OS 62 may then modify the power management configuration to route interrupts to processing unit 32.

As shown at block 244, OS 62 may then start a power policy manager. That program may be loaded into sequestered partition 52 from mass data storage 38, for example, and it may include data to specify the power management policies to be used. As indicated at block 256, the power policy manager may then register various wake events, based on the predetermined power management policy specifications. For example, power policy manager may register wake events to provide digital video recorder (DVR) functionality (e.g., to wake sequestered partition 52 or main partition 50 to record a television show). Additional types of wake events may include, without limitation, events to trigger waking to record other types of broadcast content, as well as events to trigger waking to perform scheduled platform maintenance, such as hard disk defragmentation, virus scanning, etc. Processing system 20 may also be configured to generate wake events for dynamic functions, such as to receive incoming communications (e.g., voice over Internet Protocol (VoIP) calls), wake on LAN, wake when the power button is pressed, etc.

Some types of events may be generated spontaneously, and sequestered partition 52 may set one or more timers to provide for periodic checking for other types of events. For instance, an incoming phone call could generate a spontaneous event, while a disk backup or show recording could be scheduled using the RTC. RTC events could be scheduled to wake the machine periodically, to allow for checking if any scheduled actions should be started. The RTC could also be programmed to wake the machine at the start time of the next event.

The power policy manager may also register wake events to support functions to be performed by legacy partition 50. For instance, legacy partition 50 may handle one or more of the functions listed above.

The power policy manager may examine the values of the RTC registers that were saved at block 242 to determine whether OS 60 had scheduled an alarm that would occur earlier than the next RTC alarm scheduled for OS 62. If so, the power policy manager may set the next RTC alarm according to the saved values. The power policy manager may also associate ownership flags with events, to identify which events belong to OS 60 and which belong to OS 62.

As indicated at block 248, sequestered partition 52 may then write the S1 state to chipset 17, possibly through use of an ACPI port in BIOS 42, thereby causing all processing units to enter sleep mode. Since the power management hardware will have been reconfigured to route interrupts to processing unit 32, when the hardware subsequently issues a wake event (e.g., in response to an RTC alarm or an incoming communication), OS 62 will receive the interrupt or wake event, as indicated at block 250. As shown at block 260, sequestered partition 52 may then determine whether the wake event is for sequestered partition 52 or main partition 50, based on the ownership flag for that wake event.

Also, in addition to the preconfigured wake events, OS 62 may monitor for dynamic wake events. For instance, OS 62 may receive a wake event if a user presses the power button of processing system 20, and sequestered partition 52 may consider such events to belong to legacy partition 50.

If the wake event corresponds to work to be performed by sequestered partition 52, sequestered partition 52 may handle the event, as indicated at block 262. For instance, depending on the work associated with the wake event, sequestered partition 52 may record a TV show, provide VoIP communications services, etc. Once the work has been completed, sequestered partition 52 may return the processing units to sleep mode, as indicated by the arrow from block 262 to block 248.

However, if the work associated with the wake event is to be handled by legacy partition 50, the process may pass from block 260 through page connector C to block 266. Sequestered partition 52 may then restore the power management settings that were saved at block 242. Then, sequestered partition 52 may clear the legacy standby flag to release legacy partition 50 from reduced power mode, as indicated at block 268.

Clearing the legacy standby flag may serve as a wake command. Consequently, legacy partition 50 may perform any necessary operations to prepare for executing useful work, as discussed above with regard to blocks 342-352. Legacy partition may then service the wake event, as indicated at block 310.

Referring again to block 268, after sequestered partition 52 has released legacy partition 50 from reduced power mode, the process may pass through page connector E, and sequestered partition 52 may continue to provide value added services, as shown at block 210. Thus, once sequestered partition 52 has released legacy partition 50 from low power mode, both OSs may resume execution.

Figure 6:
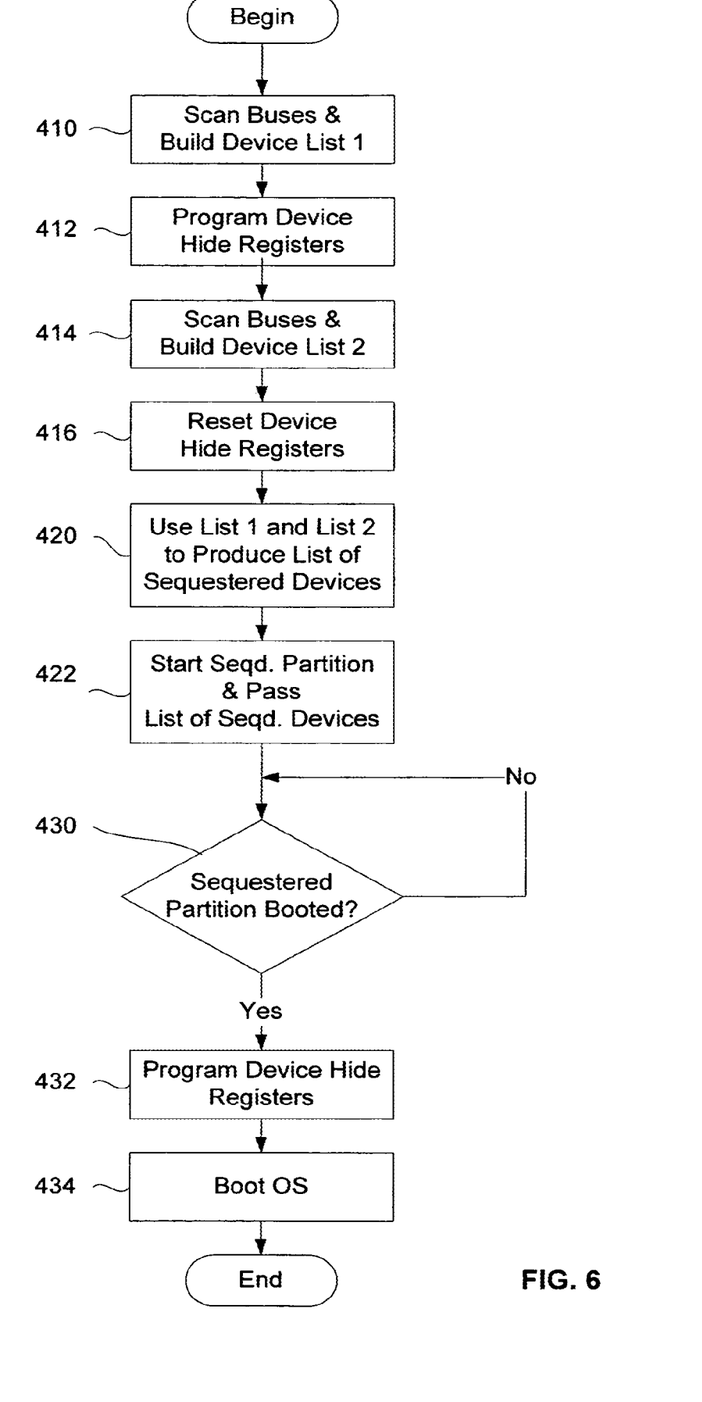
FIGS. 6 and 7 are flowcharts depicting various aspects of a process for creating partitions in a processing system, according to an example embodiment of the present invention.
Figure 7:
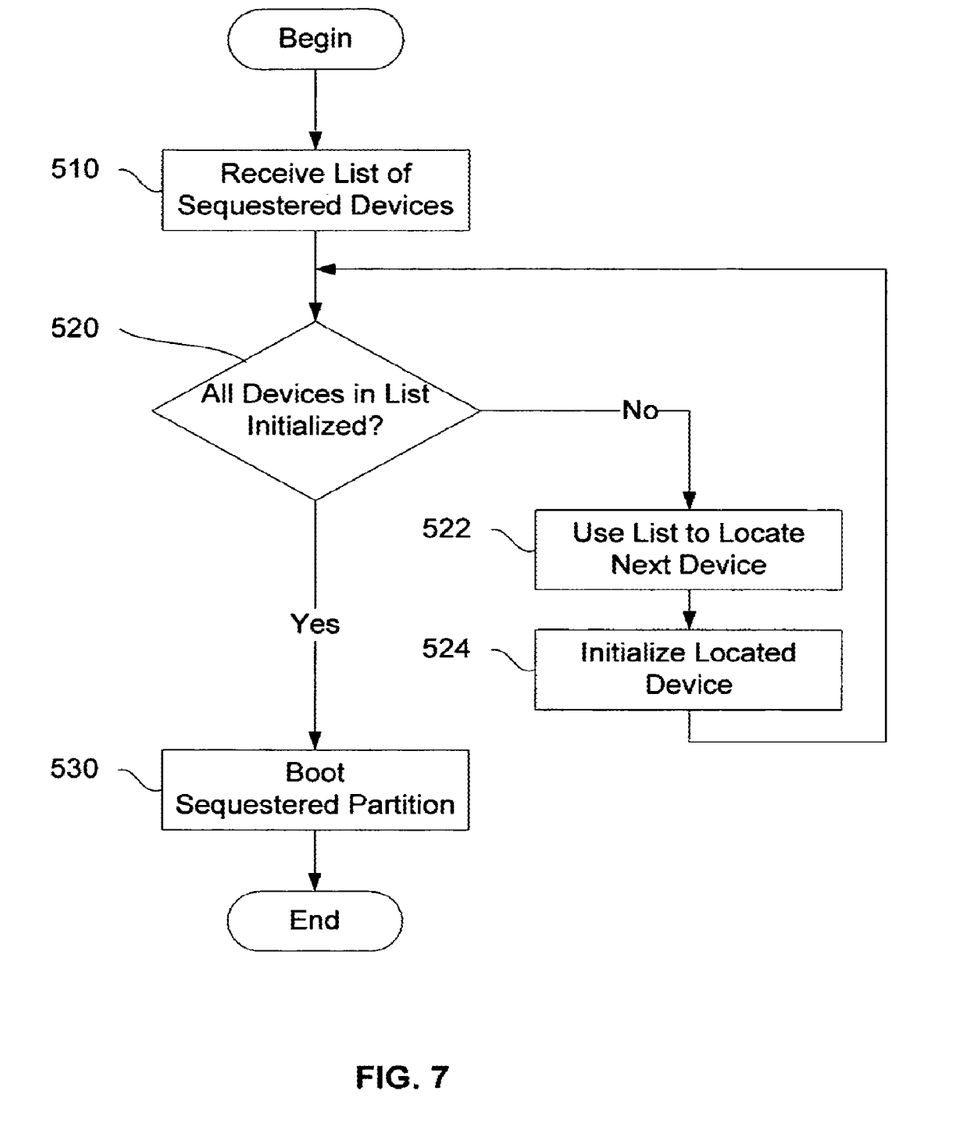

FIGS. 6 and 7 are flowcharts depicting various aspects of a process for creating partitions in a processing system, according to an example embodiment. In particular, FIG. 6 represents the perspective of legacy partition 50, while FIG. 7 represents the perspective of sequestered partition 52.

FIG. 6 begins with processing system 20 at or near the beginning of an initialization process. That process may have started in response to processing system 20 being powered on or reset, for instance. At block 410, BIOS 40 in legacy partition 50 may scan all PCI buses in processing system 20, as well as any other buses, and may build a first device list identifying all of the devices discovered on those buses. For instance, in the example embodiment, processing system 20 may scan one or more PCI buses, PCI-E buses, USB buses, industry standard architecture (ISA) buses, etc. In alternative embodiments, other types of buses may be scanned. The process of scanning buses in a processing system to determine which devices are present may be referred to in general as a bus scan. A bus scan may include operations such as the programming of bridges and device base address registers (BARs).

When building the first device list, legacy partition 50 may include the location information for some or all of the devices discovered during the first scan. For example, the location information may include the bus number, the device number, the function number, and the device type for each discovered device. The device type or any other suitable flag or data item may be used to keep track of which devices are bridges. For bridges, the local information may also identify the type of bridge and may include other information associated with a bridge, such as subordinate bus information.

As indicated at block 412, after the first device list has been built, legacy partition 50 may program device hide registers 94 and/or similar configuration constructs to hide certain predetermined devices. This programming may set or clear bits in the configuration constructs, based on a pre-selected device distribution. For instance, ROM 28 may have been pre-programmed by a user (e.g., a manufacturer, an administrator, an end user, etc.) with configuration information that specifies which devices are to be used by sequestered partition 52 and hidden from legacy partition 50. In alternative embodiments, the main partition may retrieve the configuration information from any other suitable data repository.

The configuration information may identify the devices to be hidden by specifying how device hide registers 94 and similar configuration constructs are to be configured. For instance, processing system 20 may assign the device number 0 to a device in the expansion slot labeled PCI 1 in FIG. 2, and if an administrator has configured processing system 20 to hide that device, the configuration information may include data indicating that bit 0 of a Secondary PCI Device Hiding (SPDH) register should be set to 1. The configuration information in ROM 28 may use similar approaches to identify other types of devices to be hidden, such as SATA controllers, an onboard NIC, devices on other types of buses, etc. For instance, the configuration information may include data indicating that legacy partition 50 is to use a function disable (FD) register to hide particular devices on PCI-E buses, USB buses, etc.

As indicated at block 414, legacy partition 50 may then perform a second bus scan, and may build a second device list to identify all of the devices detected during the second scan. Legacy partition 50 may then reset the configuration constructs to unhide or unblock any hidden devices, as indicated at block 416. Also, as shown at block 420, legacy partition 50 may compare the first and second device lists and produce a list of devices to be sequestered, to include the devices found in the first scan but not in the second scan. The list produced based on the comparison may be referred to as the list of sequestered devices, and that list may include the same type of location information as the first device list, for each device to be sequestered.

As shown at block 422, legacy partition 50 may then start sequestered partition 52, and may pass the list of devices to be sequestered to sequestered partition 52. Since no devices will be hidden, in accordance with block 416, sequestered partition 52 will be able to read the configuration space of the devices to be sequestered.

As indicated at block 430, after sending the sequestered device list to sequestered partition 52, legacy partition 50 may wait until sequestered partition 52 has booted. As shown at block 432, after sequestered partition 52 has booted, legacy partition 50 may again program configuration constructs such as device hide registers 94 to hide the sequestered devices from legacy partition 50. Legacy partition 50 may then boot OS 60, as indicated at block 434. The process of FIG. 6 may then end.

The process of FIG. 7 may start in response to the operations depicted at block 422 of FIG. 5, when legacy partition 50 starts sequestered partition 52. As indicated at block 510 of FIG. 6, once started, sequestered partition 52 may receive from legacy partition 50 the list of devices to be sequestered. Sequestered partition 52 may then initialize the devices on the list without performing a bus scan.

For instance, sequestered partition 52 may determine whether all of the devices on the list have been initialized, as shown at block 520. If sequestered partition 52 has not yet initialized all of the devices on the list, sequestered partition 52 may select a next device to be initialized, and may use information in the list such as the bus number, the device number, the function number, and the device type for the selected device to locate that device, as shown at block 522. As indicated at block 524, sequestered partition 52 may then initialize that device. When initializing a device, sequestered partition 52 may extract whatever information it requires from the configuration space of that device, and may perform any other operations necessary to configure the device, such as programming BARs of the device and possibly executing an option ROM of the device. However, in the example embodiment, sequestered partition 52 avoids reprogramming any bridges or device BARs, since, depending on the bus topology, reconfiguring bridges or device BARs could render the bridges or devices inaccessible. Also, in the example embodiment, sequestered partition 52 does not initialize any devices that aren't assigned to it (i.e., that are not included in the list of sequestered devices).

Once all of the devices for sequestered partition 52 have been initialized, sequestered partition 52 may boot OS 62, as indicated at block 530, and sequestered partition 52 may use the sequestered devices. The process of FIG. 7 may then end.

Thus, one partition in a processing system may discover locations of devices to be sequestered, and may pass a list with location information for those devices to a second partition. The second partition may then initialize those devices. Device hide registers and/or related configuration constructs may then be programmed to hide or block those devices for the first partition. In the example embodiment, the device hide registers are so programmed before the OS on the first partition boots. In various embodiments, functions like programming the ICH registers to block configuration access to the sequestered devices may be performed by the either partition. In the example embodiment, the location of each sequestered device is provided to the sequestered partition, and the sequestered partition therefore need not perform a bus scan. The sequestered partition may therefore avoid the ambiguous results that could happen if the sequestered partition were to scan buses containing multiple instances of the same type of device (e.g., USB ports). In addition, even though the main partition may set device hide registers and/or related settings after the sequestered partition has booted, the sequestered partition may continue to use the hidden devices since the ICH may block configuration cycles for the sequestered devices, but it may not block access to the I/O addresses and memory mapped registers of those devices.

Also, as indicated above, a processing system may contain more than one main partition, more than one sequestered partition, or multiple main partitions and sequestered partitions. Such processing systems may use variations of the process described above to implement sequestered devices for one or more sequestered partitions.

In the example embodiment, all of the interrupt handlers described above execute on processing units that have access to RAM, that are capable of running full-featured OSs, etc. In one embodiment, those processing units are connected by a main bus (e.g., a front side bus) with no bus bridges interposed between the processing units, although the main bus may use interconnect switches to support communications between the processing units in some embodiments.

The interrupt handlers may, in effect, trap a standby command from the legacy OS and allow the sequestered partition to control power management. For instance, as described with respect to FIGS. 3-5, once the legacy partition is in pseudo-standby and the sequestered partition has no pending tasks, the sequestered partition can put the system into conventional standby. Then, upon a wake event, the sequestered partition can resume first, and it can then release the legacy partition from its SMI handler.

Also, the description above focuses on a processing system in which the sequestered partition runs on the BSP and the main partition runs on the AP. However, those roles could be swapped in alternative embodiments, with components such as the SMI handlers designed accordingly.

In accordance with the description above, embodiments of the present invention may provide for improved power management without requiring changes to conventional hardware and without requiring changes to conventional OSs. An OS may use conventional power management semantics, yet the platform may enjoy reduced power consumption, as described above. The different partitions in the platform may also run different OSs. Virtualization or server-style hard partitioning is not required to realize the benefits of the teachings described herein.

In light of the principles and example embodiments described and illustrated herein, it will be recognized that the described embodiments can be modified in arrangement and detail without departing from such principles. For example, SMM and SMIs are described above, but alternative embodiments may use other types of execution modes and interrupts, such as platform management interrupts (PMIs).

Also, although the foregoing discussion has focused on particular embodiments, other configurations are contemplated as well. Even though expressions such as "in the example embodiment," "in one embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing functionality such as that described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. An apparatus to support power management among multiple processing system partitions, the apparatus comprising:
   a first interrupt handler to execute in a first partition of a processing system, wherein the processing system includes a first processing unit for operating the first partition and a second processing unit for operating a second partition, wherein the first interrupt handler is to support power management of the first partition, and wherein the first interrupt handler, in response to an interrupt to transition the first partition from a first power mode to a second power mode that consumes less power than the first power mode, is to place the first partition in a third power mode that consumes less power than the first power mode, but more power than the second power mode; and
   a second interrupt handler to execute in the second partition, wherein the second interrupt handler is to support power management of the second partition and the first partition, wherein the second interrupt handler, in response to the interrupt, is to take control of determining when the first partition is to leave the third power mode and return to the first power mode.

2. The apparatus of claim 1, wherein the first power mode comprises a full power mode with tasks being executed, the second power mode comprises a reduced power mode with no task executed, and the third power mode comprises the full power mode with an idle task being continuously executed.

3. The apparatus of claim 1, wherein the second interrupt handler is to manage one or more flags in a shared memory of the processing system to keep the first partition in the third power mode or to return the first partition to the first power mode.

4. The apparatus according to claim 1, further comprising:
   a power policy manager to execute in the sequestered partition to provide one or more policies to the second interrupt in determining whether to keep the first partition in the third power mode or to return the first partition to the first power mode, when the second interrupt handler takes control in determining whether the first partition is to stay in the third power mode or to return to the first power mode.

5. The apparatus according to claim 1, further comprising power management hardware that supports an advanced configuration and power interface (ACPI), wherein power management support of the first and second interrupt handlers includes configuration of the power management hardware through the ACPI.

6. The apparatus according to claim 5, wherein the power management hardware comprises real time clock (RTC) hardware that includes registers for configuring the RTC.

7. The apparatus according to claim 5, wherein the power management hardware comprises an input/output advanced programmable interrupt controller (IO-APIC), wherein power management support of the second interrupt handler includes configuration of the IO-APIC.

8. The apparatus according to claim 1, wherein the first partition comprises a legacy partition, and the second partition comprises a sequestered partition invisible to an operating system of the legacy partition; and wherein the sequestered partition is dedicated to a predetermined number of designated processing tasks.

9. A method for managing power in a processing system, the method comprising:
   in response to a request to transition a first partition of a processing system being operated by a first processing unit of the processing system from a first power mode to a second power mode that consumes less power than the first power mode, transitioning the first partition, by a first interrupt handler associated with the first partition, to a third power mode that consumes less power than the first power mode, but more power than the second power mode;
   additionally, in response to the request, taking control, by a second interrupt handler, associated with a second partition of the processing system being operated by a second processing unit of the processing system, over determining when the first partition is to leave the third power mode and return to the first power mode.

10. The method of claim 9, wherein the first power mode comprises a full power mode with tasks being executed, the second power mode comprises a reduced power mode with no task executed, and the third power mode comprises the full power mode with an idle task being continuously executed.

11. The method of claim 9, wherein taking control comprises the second interrupt handler managing one or more flags in a shared memory of the processing system to keep the first partition in the third power mode or to return the first partition to the first power mode.

12. The method according to claim 9, wherein taking control comprises the second interrupt handler using one or more policies provided by a power policy manager in the second partition, in making the determination to keep the first partition in the third power mode or to return the first partition to the first power mode.

13. The method according to claim 9, wherein the first and second handlers respectively provides power management support for the first and second partitions, including configuring power management hardware of the processing system via an advanced configuration and power interface (ACPI) supported by the power management hardware.

14. The method according to claim 13, wherein taking control comprises taking control of, by the second interrupt handler, real time dock (RTC) hardware of the power management hardware, including configuring, by the second interrupt handler, registers of the RTC.

15. The method according to claim 13, wherein configuring includes configuring, by the second interrupt handler, an input/output advanced programmable interrupt controller (IO-APIC) of the processing system.

16. The method according to claim 9, wherein the first partition comprises a legacy partition, and the second partition comprises a sequestered partition invisible to an operating system of the legacy partition; and wherein the sequestered partition is dedicated to a predetermined number of designated processing tasks.

17. At least one non-transitory storage medium comprising instructions stored therein, configured to enable a processing system, in response to execution of the instructions, to manage power consumption by a first and a second partition respectively operated by a first and a second processing unit of the processing system, wherein management of power consumption includes:
  a first interrupt handler to execute in the first partition, wherein the first interrupt handler is to support power management of the first partition, and wherein the first interrupt handler, in response to an interrupt to transition the first partition from a first power mode to a second power mode that consumes less power than the first power mode, is to place the first partition in a third power mode that consumes less power than the first power mode, but more power than the second power mode; and
  a second interrupt handler to execute in the second partition, wherein the second interrupt handler is to support power management of the second partition and the first partition, wherein the second interrupt handler, in response to the interrupt, is to take control of determining when the first partition is to leave the third power mode and return to the first power mode.

18. The at least one storage medium of claim 17, wherein the first power mode comprises a full power mode with tasks being executed, the second power mode comprises a reduced power mode with no task executed, and the third power mode comprises the full power mode with an idle task being continuously executed.

19. The at least one storage medium of claim 17, wherein the second interrupt handler is to manage one or more flags in a shared memory of the processing system to keep the first partition in the third power mode or to return the first partition to the first power mode.

20. The at least one storage medium of claim 17, wherein management of power consumption further includes:
  a power policy manager to execute in the sequestered partition to provide one or more policies to the second interrupt handler to determine whether to keep the first partition in the third power mode or return the first partition to the first power mode, when the second interrupt handler takes control in determining when the first partition is to stay in the third power mode or to return to the first power mode.

21. The at least one storage medium of claim 17, wherein the processing system includes power management hardware that supports an advanced configuration and power interface (ACPI), and wherein power management support of the first and second interrupt handlers includes configuration of the power management hardware through the ACPI.

22. The at least one storage medium of claim 21, wherein the power management hardware comprises real time clock (RTC) hardware that includes registers for configuring the RTC.

23. The at least one storage medium of claim 21, wherein the power management hardware comprises an input/output advanced programmable interrupt controller (IO-APIC), wherein power management support of the second interrupt handler includes configuration of the IO-APIC.

24. The at least one storage medium of claim 17, wherein the first partition comprises a legacy partition, and the second partition comprises a sequestered partition invisible to an operating system of the legacy partition; and wherein the sequestered partition is dedicated to a predetermined number of designated processing tasks.

* * * * *